United States Patent
Curlic et al.

(10) Patent No.: US 10,371,242 B2
(45) Date of Patent: Aug. 6, 2019

(54) METHOD FOR ASSEMBLING A CAMSHAFT

(71) Applicant: ThyssenKrupp Presta TecCenter AG, Eschen (LI)

(72) Inventors: Marko Curlic, Schaanwald (LI); Aaron Pfitscher, Ludesch (AT); Jörg Schätzle, Wangen (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 139 days.

(21) Appl. No.: 15/328,392

(22) PCT Filed: Jul. 1, 2015

(86) PCT No.: PCT/EP2015/064929
§ 371 (c)(1),
(2) Date: Jan. 23, 2017

(87) PCT Pub. No.: WO2016/012206
PCT Pub. Date: Jan. 28, 2016

(65) Prior Publication Data
US 2017/0211680 A1    Jul. 27, 2017

(30) Foreign Application Priority Data
Jul. 23, 2014    (DE) .................. 10 2014 011 067

(51) Int. Cl.
*F16H 53/02*    (2006.01)
*B23P 11/02*    (2006.01)
*F01L 1/047*    (2006.01)

(52) U.S. Cl.
CPC .......... *F16H 53/025* (2013.01); *B23P 11/025* (2013.01); *F01L 1/047* (2013.01); *B23P 2700/02* (2013.01); *F01L 2001/0471* (2013.01)

(58) Field of Classification Search
CPC ........ F16H 53/025; F16H 53/02; F01L 1/047; F01L 1/04; B23P 11/025
See application file for complete search history.

(56) References Cited

U.S. PATENT DOCUMENTS 4,903,543 A * 2/1990 Matt ................. B23P 11/00
403/282

FOREIGN PATENT DOCUMENTS

DE    10 2008 053 723 A1    5/2010
DE       102010045047 A1    3/2012
(Continued)

OTHER PUBLICATIONS

English translation of International Search Report for International patent application No. PCT/EP2015/064929; dated Oct. 5, 2015.
(Continued)

*Primary Examiner* — Thomas C Diaz
(74) *Attorney, Agent, or Firm* — thyssenkrupp North America, Inc.

(57) ABSTRACT

A camshaft may include a support shaft and a component with a passage opening that receives the support shaft. The support shaft may include fastening regions and positioning regions alternating in an axial direction. A diameter of the support shaft in the fastening regions may be greater than a diameter of the support shaft in the positioning regions. Furthermore, the passage opening of the component may include axially spaced fastening sections with positioning sections arranged between pairs of the fastening sections. A diameter of the passage opening in the fastening sections may be smaller than a diameter of the passage opening in the positioning sections. Further, the diameter of the support shaft in the positioning regions may be smaller than the diameter of the passage opening in the fastening sections, and the diameter of the support shaft in the fastening regions (Continued)

may be smaller than the diameter of the passage opening in the positioning sections.

12 Claims, 3 Drawing Sheets

(56) References Cited

FOREIGN PATENT DOCUMENTS

| | | |
|---|---|---|
| DE | 10 2012 206 499 A1 | 10/2013 |
| DE | 102012025442 A1 | 6/2014 |
| GB | 2290599 A | 1/1996 |
| JP | H04107406 U | 9/1992 |
| JP | 2004011699 A | 1/2004 |
| JP | 2008-157062 A | 7/2008 |
| WO | 92/02739 A1 | 2/1992 |
| WO | 95/35434 A1 | 12/1995 |
| WO | 2012/031770 A1 | 3/2012 |

OTHER PUBLICATIONS

English Language Abstract for DE 102010045047 A1.

\* cited by examiner

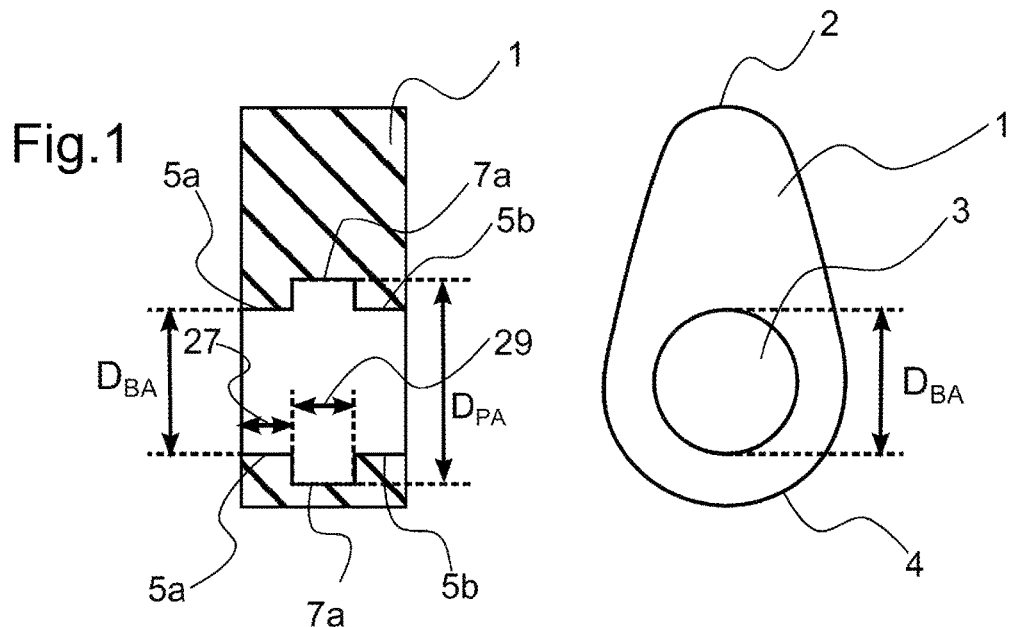
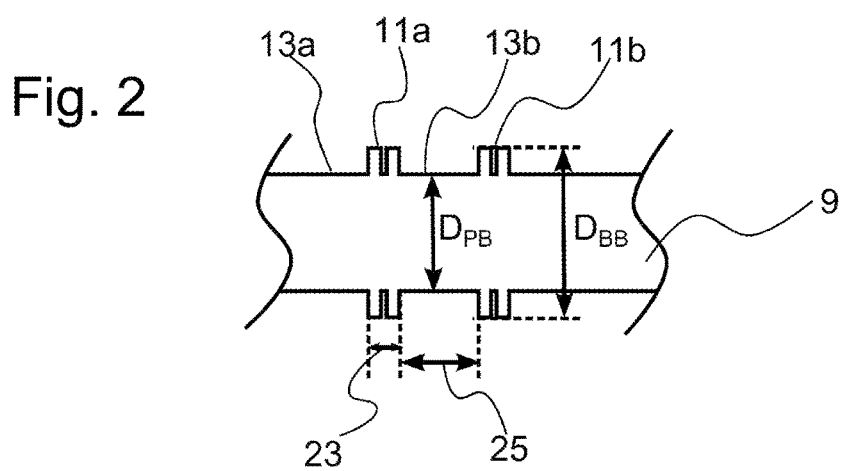
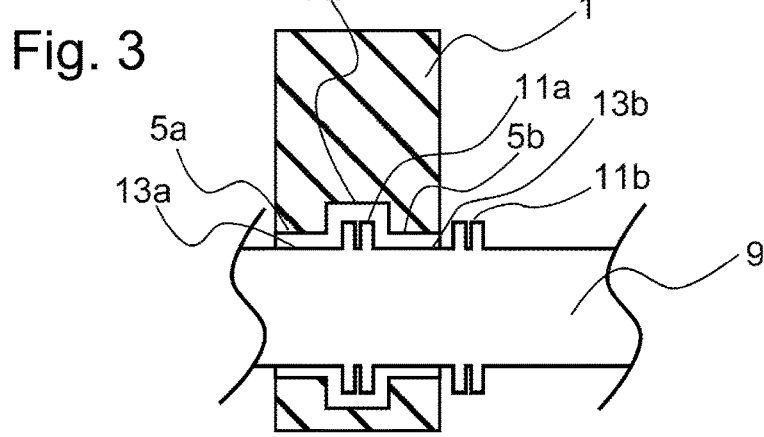

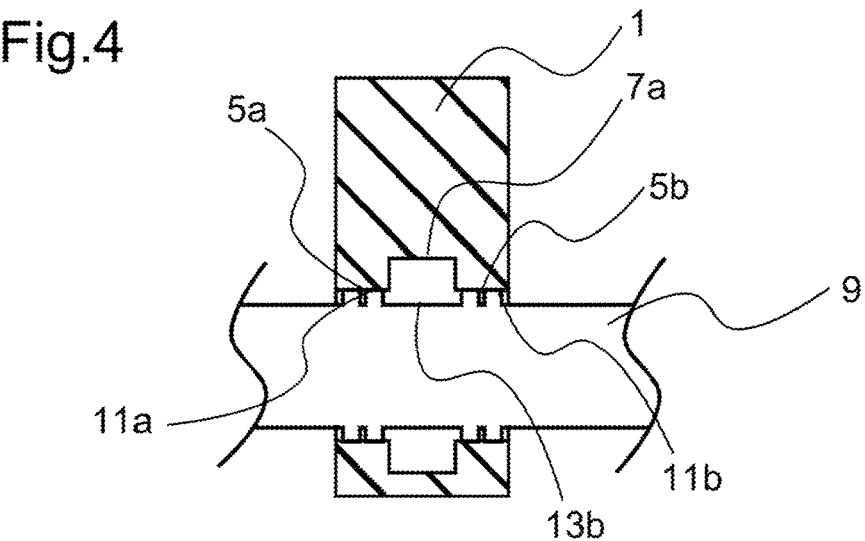
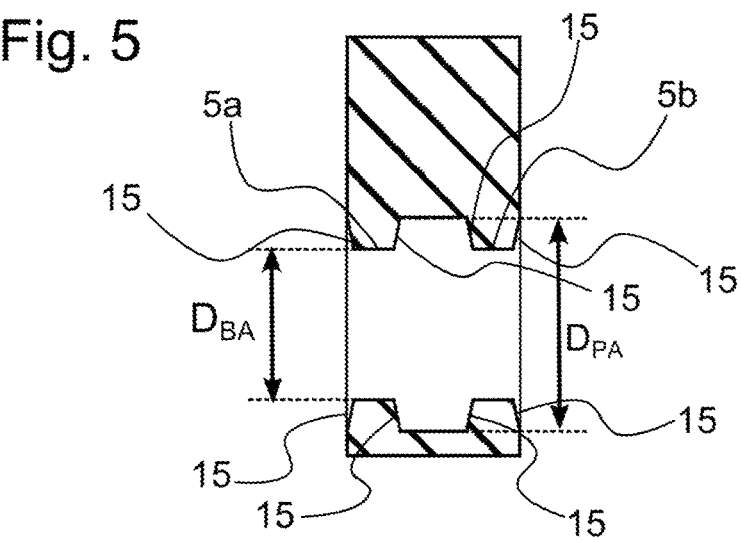
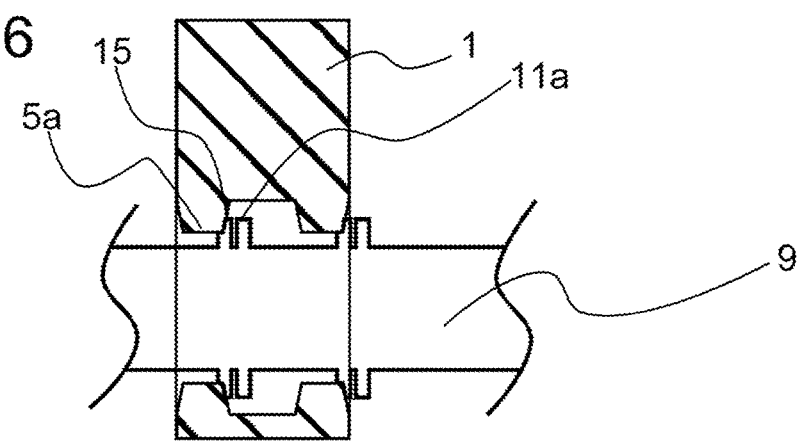

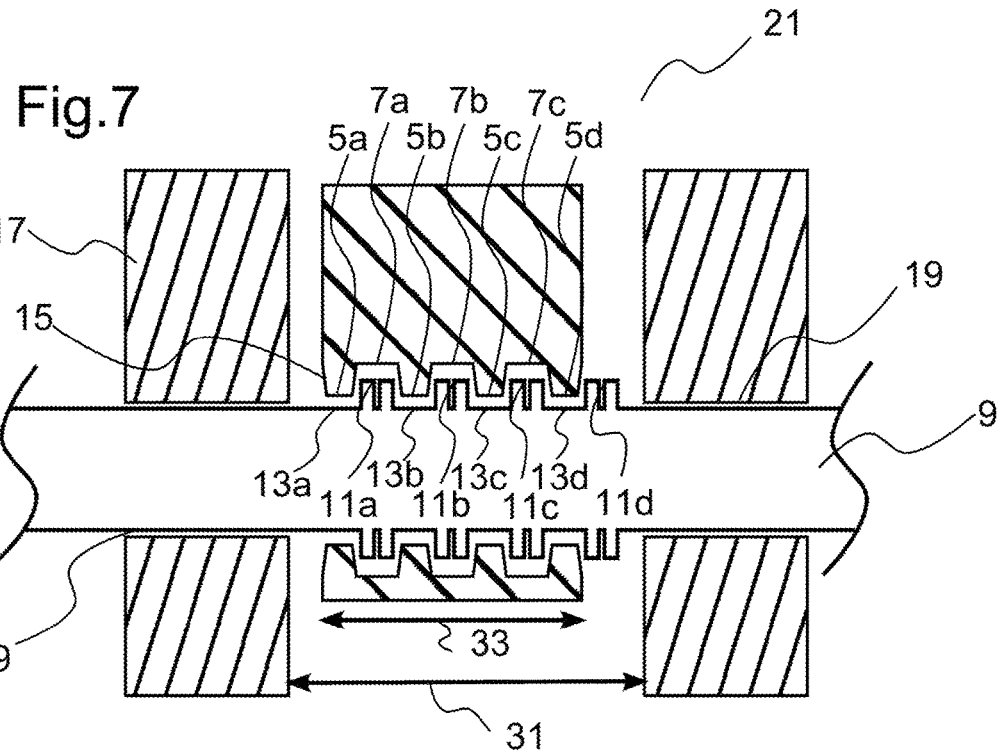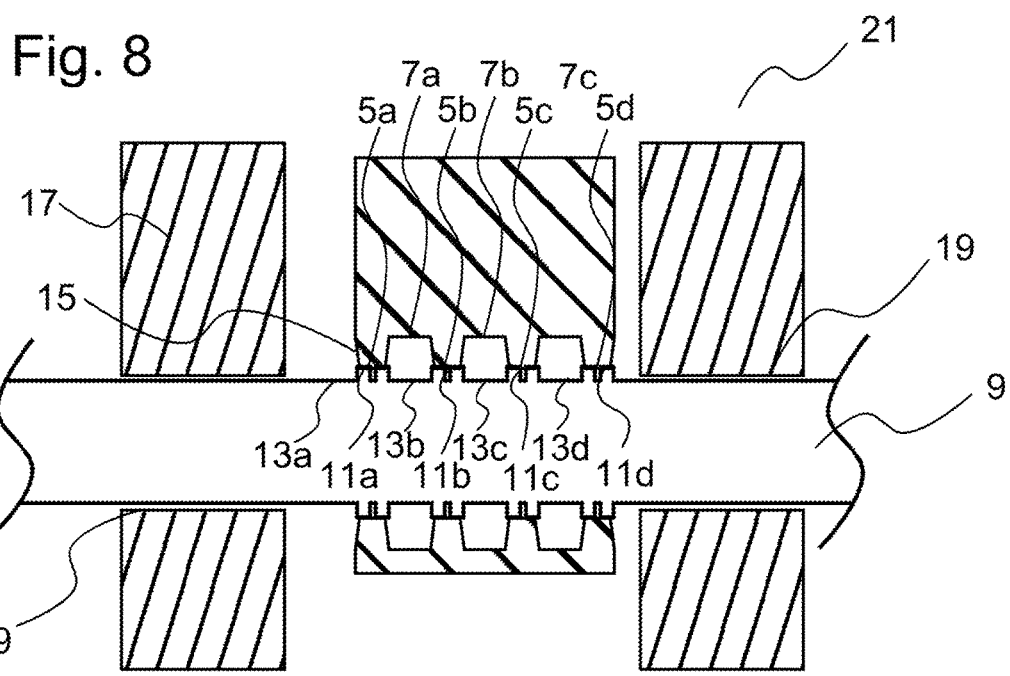

METHOD FOR ASSEMBLING A CAMSHAFT

CROSS REFERENCE TO RELATED APPLICATIONS

This application is a U.S. National Stage Entry of International Patent Application Serial Number PCT/EP2015/064929, filed Jul. 1, 2015, which claims priority to German Patent Application No. DE 10 2014 011 067.2 filed Jul. 23, 2014, the entire contents of both of which are incorporated herein by reference.

FIELD

The present disclosure generally relates to camshafts that include a support shaft and a component with a passage opening for receiving the support shaft, to methods for assembling such camshafts, and to methods for assembling engine modules.

BACKGROUND

It is known to produce camshafts in that components are produced separately and subsequently connected with a support shaft. For example, WO2012/031770 discloses an assembly method with which the components are initially positioned next to associated expansions of the support shaft and pressed onto the expansions in a following step. This means that the component during the pressing-in operation has to be moved in axial direction by at least a distance in axial direction which corresponds to the axial width of the component. Here, the axial direction is defined by the axis of rotation of the camshaft later on. Especially with components having a relatively great extent in axial direction this results in that a large assembly path during the pressing-in operation occurs. In addition, a corresponding axial region next to the expansion has to be kept clear on the support shaft in order for the component to be positioned there before the pressing-in operation. In particular, where the components are to be fastened on the support shaft very tightly, such a region cannot always be reserved. Particular problems also occur when the camshaft is to be produced in a closed bearing gallery since in this case the installation space of the bearing mounts of the cylinder head cover also has to be taken into account.

BRIEF DESCRIPTION OF THE FIGURES

FIG. 1 is a sectional view and a front view of an example component in the form of a cam with fastening sections and a positioning section.

FIG. 2 is a detail view of an example support shaft with fastening regions and positioning regions.

FIG. 3 is a sectional view of an example cam on a support shaft in a first axial position.

FIG. 4 is a sectional view of an example cam on a support shaft in a second axial position.

FIG. 5 is a sectional view of another example component.

FIG. 6 is a sectional view of an example cam on a support shaft in a preliminary position.

FIG. 7 is a sectional view of an extract of a module for a motor vehicle engine with a cam on a support shaft in a first axial position.

FIG. 8 is a sectional view of an extract of a module for a motor vehicle engine with a cam on a support shaft in a second axial position.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to configure components and a support shaft in such a manner that axial installation space required for assembly is reduced in size.

This object is solved through a camshaft comprising a support shaft and a component with a passage opening for receiving the support shaft. Here, the support shaft comprises a plurality of fastening regions and positioning regions alternately arranged axially, wherein the diameter of the support shaft in the fastening regions is greater than the diameter of the support shaft in the positioning regions. Thus, the support shaft has a tooth-like profile in axial direction. Furthermore, the passage opening of the component comprises a plurality of axially spaced fastening sections, wherein between two axially adjacent fastening sections a positioning section is arranged in each case and the diameter of the passage opening in the fastening sections is smaller than the diameter of the passage opening in the positioning sections. Accordingly, the passage opening of the component has a tooth-like profile in axial direction. In addition, the diameter of the support shaft in the positioning regions is smaller than the diameter of the passage opening in the fastening sections and the diameter of the support shaft in the fastening regions is smaller than the diameter of the passage opening in the positioning sections. In addition, the respective axial extent of the fastening regions, positioning regions, fastening sections and positioning sections is determined in such a manner that there is a first axial position of the component relative to the support shaft, in which all fastening sections of the component fall completely within positioning regions of the support shaft and all positioning sections of the component in each case overlap a fastening region of the support shaft in axial direction. Here, a fastening section falls within a positioning region when the projection of the fastening section on the axis of rotation of the support shaft lies within the projection of the positioning region on the axis of rotation of the support shaft. Accordingly, a positioning section overlaps a fastening region when the projection of the fastening region lies within the projection of the positioning section.

This special selection of axial extents and diameter relations results in that the support shaft and the component engage into one another in the first axial position in the manner of intermeshing teeth. Here, the fastening regions and fastening sections form projecting teeth which engage into one another. Thus, the component is not arranged next to the final assembly position as known from the prior art but merely offset by a tooth width. Consequently it need be moved only by this tooth width during the pressing-on operation. Accordingly, the axial installation space required for the assembly is significantly reduced.

Because of the fact that the diameter of the support shaft in the positioning regions is smaller than the diameter of the passage opening in the fastening sections and the diameter of the support shaft in the fastening regions is smaller than the diameter of the passage opening in the positioning sections, the component is freely rotatable in the first axial position so that the angular position of the component relative to the support shaft can be adjusted without problems.

In a further developed embodiment of the camshaft, the axial extent of the fastening regions, positioning regions, fastening sections and positioning sections is such that there is a second axial position of the component relative to the support shaft in which the fastening sections in axial direction at least partially overlap fastening regions in order to fix the component on the support shaft. In this way, an overlap between teeth which previously obliquely stood opposite one another can be brought about by a simple movement of the component relative to the support shaft from the first axial position to the second axial position. When establishing this overlap, the support shaft is plastically deformed in the fastening regions so that the component is connected with the support shaft in a force-fit manner. Alternatively, the component can also be plastically deformed in the fastening sections or a deformation of component and support shaft occurs in the fastening regions and fastening sections located opposite.

The diameter relations described in this application apply, unless otherwise stated, to the state in which support shaft and component have the same temperature. In the case of assembly steps in the meantime which are described in the following, a temperature differential is deliberately brought about. Other diameter relations can be present during these intermediate steps.

In a further developed embodiment, all fastening regions have the same axial extent and all positioning regions have the same axial extent. Thus, a periodical tooth structure is obtained on the support shaft which is particularly easily produced.

In a further developed embodiment, all fastening sections have the same axial extent and all positioning sections have the same axial extent. This results in a periodical tooth structure in the interior of the passage opening of the component which is particularly easily produced.

In a particularly preferred embodiment version, the previously described periodical tooth structure of the support shaft has the same period as the periodical tooth structure in the interior of the passage opening. This is the case when all positioning regions, fastening regions, positioning sections, fastening sections each have the same axial extent and the sum of the axial extent of a positioning region and of a fastening region is equal to the sum of the axial extent of a positioning section and of a fastening section. This same period has the advantage that the regions overlapping one another in the second axial position likewise have a regular periodical structure (with the same period). Since the force transmission between support shaft and component takes place via these overlapping regions, this construction results in a highly uniform force transmission.

In a further development of the camshaft, all fastening regions have a first axial extent, all positioning regions a second axial extent, all fastening sections a third axial extent and all positioning sections a fourth axial extent. Here, the first axial extent is smaller than the fourth axial extent and the third axial extent is smaller than the second axial extent. This is a particularly simple and regular version which ensures that in the first axial position the component is freely rotatable.

In a further configuration of the cams according to the invention, the positioning regions comprise introduction chamfers. This brings about a more controlled pressing-on operation from the first into the second axial position.

The object according to the invention is likewise solved through a method for assembling a camshaft from a support shaft and a component to be connected, wherein the component comprises a passage opening for receiving the support shaft. Here, the method comprises the following method steps:

a. a support shaft and a component are made available, wherein
  i. the support shaft comprises a plurality of fastening regions and positioning regions alternately arranged axially,
  ii. the passage opening (3) of the component comprises a plurality of axially spaced fastening sections,
  iii. between two axially adjacent fastening sections a positioning section is arranged in each case,
  iv. the diameter of the support shaft in the positioning regions is smaller than the diameter of the passage opening in the fastening sections,
  v. the diameter of the support shaft in the fastening regions is smaller than the diameter of the passage opening in the positioning sections,
  vi. the diameter of the support shaft in the fastening regions is greater than the diameter of the support shaft in the positioning regions,
  vii. the diameter of the passage opening in the fastening sections is smaller than the diameter of the passage opening in the positioning sections,
  viii. the axial extent of the fastening regions, positioning regions, fastening sections and positioning sections is such that there is a first axial position of the component relative to the support shaft, in which all fastening sections of the component fall completely within positioning regions of the support shaft and all positioning sections of the component in each case overlap a fastening region of the support shaft in axial direction
  ix. and wherein the axial extent of the fastening regions, positioning regions, fastening sections and positioning sections is such that there is a second axial position of the component relative to the support shaft, in which all fastening sections overlap in axial direction at least partly with fastening regions in order to fix the component on the support shaft;
b. the support shaft is cooled and/or the component is heated so that the support shaft with its fastening regions can be pushed through the passage opening;
c. the support shaft is pushed through the passage opening so that the component assumes the first axial position;
d. the support shaft is heated and/or the component is cooled;
e. the angular position of the component relative to the support shaft is adjusted while the component is located in the first axial position;
f. the component is pressed on into the second axial position.

The assembly method has the same advantages as was already described previously in connection with the support shaft and the component. The adjusting of the temperature differential in step b) results in that the component can assume the first axial position in the first place. Once the temperature equalization has taken place in step d), the component is already connected with the support shaft in the first axial position in a form-fit manner since the support shaft and the component now engage into one another in the form of intermeshing teeth.

In a further developed form of the assembly method for assembling a camshaft from a support shaft and a component to be connected, wherein the component comprises a passage opening for receiving the support shaft, the method comprises the following steps:
a. a support shaft and a component are made available, wherein
 i. the support shaft comprises a plurality of fastening regions and positioning regions which are alternately arranged axially,
 ii. the passage opening (3) of the component comprises a plurality of axially spaced fastening sections,
 iii. between two axially adjacent fastening sections a positioning section is arranged in each case,
 iv. the diameter of the support shaft in the positioning regions is smaller than the diameter of the passage opening in the fastening sections,
 v. the diameter of the support shaft in the fastening regions is smaller than the diameter of the passage opening in the positioning sections,
 vi. the diameter of the support shaft in the fastening regions is greater than the diameter of the support shaft in the positioning regions,
 vii. the diameter of the passage opening in the fastening sections is smaller than the diameter of the passage opening in the positioning sections,
 viii. the axial extent of the fastening regions, positioning regions, fastening sections and positioning sections is such that there is a first axial position of the component relative to the support shaft, in which all fastening sections of the component fall completely within positioning regions of the support shaft and all positioning sections of the component in each case overlap a fastening region of the support shaft in axial direction
 ix. and wherein the axial extent of the fastening regions, positioning regions, fastening sections and positioning sections is such that there is a second axial position of the component relative to the support shaft, in which all fastening sections in axial direction overlap at least partly with fastening regions in order to fix the component on the support shaft;
b. the support shaft is cooled and/or the component is heated so that the support shaft with its fastening regions can be pushed through the passage opening;
c. the support shaft is pushed through the passage opening so that the component assumes the preliminary position in which the fastening sections in axial direction partly overlap the fastening regions;
d. the support shaft is heated and/or the component is cooled, as a result of which the component is detachably fixed in the preliminary position;
e. the component is detached from the preliminary position and brought into the first axial position;
f. the angular position of the component relative to the support shaft is adjusted while the component is located in the first axial position;
g. the component is pressed on into the second axial position.

In contrast with the previously described method there is an additional intermediate step, during which the component is initially detachably fixed in a preliminary position. Thus, the support shaft can be moved between the steps d) and e) together with the component without the angular position of the component changing in an uncontrolled manner.

The invention likewise relates to a method for assembling a module for a motor vehicle engine from at least one cylinder head cover with bearing mounts for a support shaft and a component to be connected with the support shaft, wherein a camshaft consisting of the support shaft and the component is built according to one of those described before. In addition, the support shaft in step b) is simultaneously pushed through the bearing mounts of the cylinder head cover. Because of this, the construction of the camshaft is made possible even in closed bearing mounts.

The object according to the invention is likewise solved through a camshaft comprising a support shaft and a component with a passage opening for receiving the support shaft, wherein the support shaft has a first diameter profile in axial direction and the passage opening has a second diameter profile in axial direction. Here, the first and the second diameter profile are selected corresponding to one another in such a manner that there is a first axial position of the component in which the support shaft and the component engage into one another so that the component is fixed in axial direction in a form-fit manner. For example, the first and the second diameter profile are periodical with the same period, wherein the profiles in the first axial position are in-phase with respect to one another in that the maxima of the first diameter profile coincide with the maxima of the second diameter profile. Support shaft and component thus engage into one another in the manner of intermeshing teeth.

In particular the first diameter profile and the second diameter profile correspond to one another in such a manner that the component in the first axial position is freely rotatable relative to the support shaft. This has the advantage that the angular position of the component relative to the support shaft can be adjusted without major force expenditure.

In a further developed embodiment of the camshaft there is a second axial position of the component, in which the component is fixed in a force-fit manner. Here, the first diameter profile and the second diameter profile are designed in such a manner that the component can only be moved from the first axial position into the second axial position by a plastic deformation of the first and/or the second diameter profile. This plastic deformation has the advantage that it leads to the force-fit fixing of the component in the second axial position. Coming back to the above example with periodical diameter profiles, a phase offset would be present in the second axial position, so that the maxima of the first diameter profile coincide with the minima of the second diameter profile. However, since the amplitudes are selected in such a manner that the maxima of the first diameter profile are greater than the minima of the second diameter profile this position can only be attained in that at least one of the two diameter profiles is deformed.

In particular, the second axial position of the component differs from the first axial position of the component by less than the axial width of the component. This has the advantage that only a minor assembly path is required.

In FIG. 1, a component 1 with a passage opening 3 is shown in two sections. The component is a cam with a cam tip 2 and a cam base circle 4. The passage opening 3 in this case comprises two fastening sections 5a and 5b which are axially spaced from one another. Here, the axial direction is predetermined by the axis of rotation of the camshaft later on. Between the two axially adjacent fastening sections 5a and 5b a positioning section 7a is arranged. In the two fastening sections 5a and 5b the passage opening 3 has a diameter DBA. In the positioning section 7a located in between, the diameter DPA of the passage opening 3 is enlarged. Thus, DPA>DBA applies. Both in the positioning section 7a and also in the two fastening sections 5a and 5b the passage opening 3 has a cylindrical shape. Alternatively it is also possible that the fastening regions 5a and 5b are formed by separate mouldings which are distributed over the circumference of the passage opening. This is the case for example when an internal toothing is arranged in the fastening regions 5a and 5b. In these cases, the diameter DBA in the fastening regions is to be understood as the minimum circle diameter. In the case of an internal toothing, the diameter DBA thus corresponds to the spacing of the tooth tips located opposite.

By way of FIG. 1 it is likewise evident that the fastening regions have a first axial extent 23 and the positioning regions a second axial extent 25.

FIG. 2 shows an extract from a support shaft 9. Here, the support shaft 9 comprises two fastening regions 11a and 11b as well as two positioning regions 13a and 13b. In axial direction, the fastening regions 11a, 11b and the positioning regions 13a, 13b alternate in each case. While the diameter of the support shaft 3 in the positioning regions 13a and 13b corresponds to a base diameter of the support shaft 3, the diameter in the fastening regions 11a and 11b is expanded. This expansion can for example be produced, as schematically shown in FIG. 2, by way of rolling. Alternatively, the support shaft, starting out from a larger diameter, can also be suitably ground off. Accordingly, the diameter DBB of the support shaft 9 in the fastening regions 11a, 11b is greater than the diameter DPB of the support shaft 9 in the positioning regions 13a, 13b.

It is evident, furthermore, by FIG. 2, that the fastening sections have a third axial extent 27 and the positioning sections a fourth axial extent 29.

FIG. 3 shows the component 1 relative to the support shaft 9. It is thus evident that the diameter DPB of the support shaft 9 in the positioning regions 13a, 13b is smaller than the diameter DBA of the passage opening in the fastening sections 5a, 5b. It becomes clear, furthermore, that the diameter DBB of the support shaft in the fastening regions 11a and 11b is smaller than the diameter DPA of the passage opening in the positioning section 7a. In the shown representation, the component 1 is located in a first axial position relative to the support shaft 9. The axial extent of the fastening regions 11a and 11b, of the positioning regions 13a and 13b, of the fastening sections 5a and 5b and of the positioning section 7a is such that in the shown first axial position of the component 1 the fastening section 5a falls completely within the positioning region 13a. Furthermore, the fastening section 5b falls completely within the positioning region 13b. In addition, the positioning section 7a overlaps the fastening region 11a. The special selection of axial extents and diameter relations results in that the support shaft 9 and the component 1 engage into one another in the manner of intermeshing teeth. The component 1 in the first axial position is freely rotatable relative to the support shaft 9 so that an angular position of the component 1 can be adjusted.

By way of the relation of component 1 relative to the support shaft 9 shown in FIG. 3 it becomes clear that the first axial extent 23 is smaller than the fourth axial extent 29 and the third axial extent 27 is smaller than the second axial extent 25. The shown embodiment is the simplest regular version with exactly two fastening regions and two fastening sections.

The configuration shown in FIG. 3, in which the component 1 assumes the first axial position, is produced in that initially the support shaft 9 is cooled and/or the component 1 is heated. Because of the temperature differential, different thermal deformations occur so that the support shaft 9 with its fastening regions 11a and 11b can be pushed through the passage opening 3 of the component 1. In this state, the diameter of the fastening sections 5a and 5b is thus greater than the diameter of the fastening regions 11a and 11b. As soon as the first axial position of the component 1 has been adjusted, a temperature equalization is carried out during which the support shaft 9 is heated and/or the component 1 cooled, so that the diameter of the support shaft 9 in the fastening regions 11a, 11b is greater than the diameter of the passage opening 3 of the component 1 in the fastening sections 5a, 5b.

Starting out from the first axial position of the component 1, which is shown in FIG. 3, the component 1 is pressed on into a second axial position. The second axial position is shown in FIG. 4. During the pressing-on into the second axial position, the fastening regions 11a and 11b are plastically deformed so that the component 1 is connected with the support shaft 9 in a force-fit manner. In order to achieve this, the axial extent of the fastening regions 11a and 11b, of the positioning regions 13a and 13b, of the fastening sections 5a and 5b and of the positioning section 7a is such that in the second axial position the fastening regions 11a and 11b at least partially overlap the fastening sections 5a and 5b. While establishing this overlap the described plastic deformation occurs which fixes the component 1 on the support shaft 9 in a force-fit manner.

FIG. 5 shows a further developed version of the component 1. In this embodiment, the component 1 comprises introduction chamfers 15 in the edge regions of the positioning regions 5a and 5b. In the region of the introduction chamfers 15, the passage opening 3 has a funnel-like profile between a greater and a smaller diameter. This brings about a controlled pressing-on operation from the first into the second axial position.

FIG. 6 shows the component 1, which assumes a preliminary position, in which the fastening sections 5a and 5b in axial direction partly overlap the fastening regions 11a and 11b. This configuration is established in that initially the support shaft 9 is cooled and/or the component 1 heated. Because of the temperature differential different thermal deformations occur so that the support shaft 9 with its fastening regions 11a and 11b can be pushed through the passage opening 3. In this state, the diameter of the fastening sections 5a and 5b is thus greater than the diameter of the fastening regions 11a and 11b. As soon as the preliminary position of the component 1 has been adjusted, a temperature equalization is carried out during which the support shaft 9 is heated and/or the component 1 cooled, so that the diameter of the support shaft 9 in the fastening regions is smaller than the diameter of the component 1 in the fastening sections. In contrast with the configuration shown in FIG. 3, this additional intermediate step has the advantage that the component 1 following the temperature equalization is not immediately freely moveable. Instead, the component 1 is detachably fixed on the preliminary position in a defined angular orientation. Thus, the support shaft 1 can be moved together with the component 1 without the angular position of the component 1 changing in an uncontrolled manner.

Starting out from this intermediate step the component 1 is detached from the preliminary position and brought into the first axial position. In this position, the angular position of the component 1 relative to the support shaft is adjusted and the component pressed on into the second axial position.

FIG. 6 shows the component 1 with introduction chamfers 15. However, this is not compulsory for the assembly version with preliminary position. The component 1 shown in FIG. 1 without introduction chamfer can also be suitably preliminarily positioned.

FIG. 7 shows an extract of a module 21 for a motor vehicle engine. The module 21 comprises a cylinder head cover 17 with bearing mounts 19 for a support shaft 9. The advantage of the invention becomes particularly clear from FIG. 7. With known assembly methods, such as for example shown in WO2012/031770, the components are initially positioned next to the expansions of the support shaft and pressed onto the expansions in a following step. This means that the component during the pressing-in operation in axial direction has to be moved by at least a distance in axial direction which corresponds to the axial width of the component. As shown here in FIG. 7 there are applications however in the case of which such an assembly is not possible since the axial installation space is not sufficient in order to position the component next to the expansion. Here, the axial distance 31 of the two bearing mounts 19 for example is smaller than twice the axial width 33 of the component 1, so that the component 1 cannot be positioned next to the fastening regions 11a, 11b, 11c, 11d. Instead, support shaft 9 and component 1 are configured in such a manner that there is a first axial position of the component 1 relative to the support shaft 9 on which the component 1 is freely rotatable, but which is not located entirely next to the fastening regions 11a, 11b, 11c and 11d. For this reason, the component 1, during the pressing-on, has to be moved in axial direction by a significantly shorter distance so that the assembly becomes possible also in applications with little axial installation space. The special configuration in the shown embodiments consists in that the support shaft 9 in each case comprises four fastening regions 11a, 11b, 11c, 11d and positioning regions 13a, 13b, 13c, 13d which are each axially alternately arranged. Furthermore, the passage opening comprises four axially spaced fastening sections 5a, 5b, 5c, 5d, between which a positioning section 7a, 7b, 7c is arranged in each case. Analogous to FIGS. 1 and 2, the diameter DPB of the support shaft 9 in the positioning regions 13a-d is smaller than the diameter DBA of the passage opening 3 in the fastening sections 5a-d. In addition, the diameter DBB of the support shaft 9 in the fastening regions 11a-d is smaller than the diameter DPA of the passage opening 3 in the positioning sections 7a, 7b, 7c. Next to the diameter relations, the fastening regions 11a-d, the positioning regions 13a-d, the fastening sections 5a-d and the positioning sections 7a-c are arranged in such a manner and have such an axial extent that there is a first axial position of the component 1. FIG. 7 shows exactly this first axial position of the component 1 in which all fastening sections 5a-d fall completely within positioning regions 13a-d and all positioning sections 7a-c each overlap a fastening region 11a-d in axial direction.

Analogous to FIGS. 1 and 2, it is also true with this embodiment that the diameter of the support shaft 9 in the fastening regions 11a-d is greater than the diameter of the support shaft 9 in the positioning regions 13a-d. In addition it is also true here that the diameter of the passage opening 3 in the fastening sections 5a-d is smaller than the diameter of the passage opening 3 in the positioning sections 7a-c.

The embodiment shown in FIG. 7 is a particularly regular version with altogether four fastening regions 11a-d and four fastening sections 5a-d. In this version, all fastening regions 11a-d have the same axial extent and all positioning regions 13a-d likewise have the same axial extent. Furthermore, all fastening sections 5a-d and all positioning sections 7a-d each have the same axial extent. This produces a periodical tooth structure on the support shaft 9 and in the passage opening 3 of the component 1.

It is true, furthermore, in this embodiment that the sum of the axial extent of a positioning region 13a-d and of a fastening region 11a-d is equal to the sum of the axial extent of a positioning section 7a-c and of a fastening section 5a-d. This means that the outer contour of passage opening 3 and support shaft 9 each run periodically, wherein both have the same period. This same period has the advantage that the overlapping regions in the second axial position likewise have a regular periodical structure (with the same period). This becomes clear in the following by FIG. 8. Since the force transmission between support shaft 9 and component 1 takes place via these overlapping regions, this construction results in a highly uniform force transmission.

The configuration shown in FIG. 7, in which the component 1 assumes the first axial position, is established in that initially the support shaft 9 is cooled or the component 1 heated. Because of the temperature differential, different thermal deformations occur so that the support shaft 9 with its fastening regions 11a and 11b can be pushed through the passage opening 3 and simultaneously through the bearing mounts 19. In this state, the diameter of the passage opening in the fastening sections 5a and 5b is thus greater than the diameter of the fastening regions 11a and 11 b. Likewise, the diameter of the bearing mounts 19 in this state is greater than the diameter of the fastening regions 11a and 11b. Accordingly, sliding-in of the support shaft 9 is possible without problems. As soon as the first axial position of the component 1 has been adjusted, a temperature equalization is carried out, during which the support shaft 9 is heated and/or the component 1 is cooled, so that the diameter of the support shaft 9 in the fastening regions 11a-d is greater than the diameter of the passage opening 3 of the component 1 in the fastening sections 5a-d.

Once the desired angular position of the component 1 has been adjusted relative to the support shaft 9, while the component 1 is located in the first axial position shown in FIG. 7, the component is pressed on into the second axial position. The second axial position is shown in FIG. 8. During the pressing-on into the second axial position, the fastening regions 11a-d are plastically deformed so that the component 1 is connected with the support shaft 9 in a force-fit manner. In order to achieve this, the axial extent of the fastening regions 11a-d, of the positioning regions 13a-d, of the fastening sections 5a-d and of the positioning sections 7a-c is such that in the second axial position the fastening regions 11a-d at least partially overlap the fastening sections 5a-d. During the establishment of this overlap, the described plastic deformation occurs which fixes the component 1 on the support shaft 9 in a force-fit manner.

What is claimed is:
1. A camshaft comprising:
a support shaft that comprises fastening regions and positioning regions that alternate along an axis of the support shaft; and
a component with a passage opening for receiving the support shaft, wherein the passage opening comprises fastening sections that are axially spaced apart and positioning sections that are disposed between pairs of the fastening sections,
wherein a diameter of the support shaft in the positioning regions is smaller than a diameter of the passage opening in the fastening sections,
wherein a diameter of the support shaft in the fastening regions is smaller than a diameter of the passage opening in the positioning sections,
wherein the diameter of the support shaft in the fastening regions is greater than the diameter of the support shaft in the positioning regions,
wherein the diameter of the passage opening in the fastening sections is smaller than the diameter of the passage opening in the positioning sections,
wherein axial extents of the fastening regions, the positioning regions, the fastening sections, and the positioning sections are configured such that, when in a first position of the component relative to the support shaft, all of the fastening sections of the component fall within the positioning regions of the support shaft and all of the positioning sections of the component overlap with the fastening regions of the support shaft in an axial direction.

2. The camshaft of claim 1 wherein the component is configured to be positioned in a second position relative to the support shaft in which the fastening sections at least partly overlap the fastening regions in the axial direction to fix the component on the support shaft.

3. The camshaft of claim 1 wherein the axial extents of all of the fastening regions are the same, wherein the axial extents of all of the positioning regions are the same.

4. The camshaft of claim 1 wherein the axial extents of all of the fastening sections are the same, wherein the axial extents of all of the positioning sections are the same.

5. The camshaft of claim 1 wherein all positioning regions, fastening regions, positioning sections, and fastening sections each have the same axial extent and a sum of the axial extents of the positioning regions and the fastening regions is equal to a sum of the axial extents of the positioning sections and the fastening sections.

6. The camshaft of claim 1 wherein the fastening regions have a first axial extent, the positioning regions have a second axial extent, the fastening sections have a third axial extent, and the positioning sections have a fourth axial extent, wherein the first axial extent is smaller than the fourth axial extent and the third axial extent is smaller than the second axial extent.

7. The camshaft of claim 1 wherein the positioning regions comprise introduction chamfers.

8. A method for assembling a camshaft comprising:
providing a support shaft that includes fastening regions and positioning regions that alternate along an axis of the support shaft;
providing a component with a passage opening for receiving the support shaft, wherein the passage opening comprises fastening sections that are axially spaced apart and positioning sections that are disposed between pairs of the fastening sections, wherein
a diameter of the support shaft in the positioning regions is smaller than a diameter of the passage opening in the fastening sections,
a diameter of the support shaft in the fastening regions is smaller than a diameter of the passage opening in the positioning sections,
the diameter of the support shaft in the fastening regions is greater than the diameter of the support shaft in the positioning regions,
the diameter of the passage opening in the fastening sections is smaller than the diameter of the passage opening in the positioning sections,
axial extents of the fastening regions, the positioning regions, the fastening sections, and the positioning sections are such that there is a first axial position of the component relative to the support shaft in which all of the fastening sections of the component fall within the positioning regions of the support shaft and all of the positioning sections of the component overlap with the fastening regions of the support shaft in an axial direction,
the axial extents of the fastening regions, the positioning regions, the fastening sections, and the positioning sections are such that there is a second axial position of the component relative to the support shaft in which the fastening sections at least partly overlap the fastening regions in the axial direction to fix the component on the support shaft; and
at least one of cooling the support shaft or heating the component so that the support shaft and the fastening regions of the support shaft can be pushed through the passage opening.

9. The method of claim 8 further comprising:
pushing the support shaft through the passage opening so that the component assumes the first axial position;
at least one of heating the support shaft or cooling the component;
adjusting an angular position of the component relative to the support shaft while the component is located in the first axial position; and
pressing the component into the second axial position.

10. A method for assembling a module for a motor vehicle engine from at least one cylinder head cover with bearing mounts for the support shaft and the component of claim 9, wherein the camshaft comprising the support shaft and the component is built according to the method of claim 9, wherein the support shaft is pushed simultaneously through the passage opening and through the bearing mounts of the cylinder head cover.

11. The method of claim 8 further comprising:
pushing the support shaft through the passage opening so that the component assumes a preliminary position in which the fastening sections partly overlap the fastening regions in the axial direction;
at least one of heating the support shaft or cooling the component, as a result of which the component is detachably fixed in the preliminary position;
detaching the component from the preliminary position and bringing the component into the first axial position;
adjusting an angular position of the component relative to the support shaft while the component is located in the first axial position; and
pressing the component into the second axial position.

12. A method for assembling a module for a motor vehicle engine from at least one cylinder head cover with bearing mounts for the support shaft and the component of claim 11, wherein the camshaft comprising the support shaft and the component is built according to the method of claim 11, wherein the support shaft is pushed simultaneously through the passage opening and through the bearing mounts of the cylinder head cover.

* * * * *